(12) United States Patent
Sarenac et al.

(10) Patent No.: US 10,782,464 B1
(45) Date of Patent: Sep. 22, 2020

(54) GENERATING A LATTICE OF OPTICAL SPIN-ORBIT BEAMS

(71) Applicant: Quantum Valley Investment Fund LP, Waterloo (CA)

(72) Inventors: Dusan Sarenac, Waterloo (CA); David G. Cory, Branchton (CA); Dmitry A. Pushin, Toronto (CA); Joachim Nsofini, Waterloo (CA); Ian Hincks, Waterloo (CA)

(73) Assignee: Quantum Valley Investment Fund LP, Waterloo (CA)

( * ) Notice: Subject to any disclaimer, the term of this patent is extended or adjusted under 35 U.S.C. 154(b) by 478 days.

(21) Appl. No.: 15/824,560

(22) Filed: Nov. 28, 2017

Related U.S. Application Data

(60) Provisional application No. 62/542,969, filed on Aug. 9, 2017.

(51) Int. Cl.
| | | |
|---|---|---|
| *G02B 5/30* | (2006.01) | |
| *G02B 5/04* | (2006.01) | |
| *G02B 5/08* | (2006.01) | |
| *G02B 6/12* | (2006.01) | |
| *G02B 5/20* | (2006.01) | |

(52) U.S. Cl.
CPC ............. *G02B 5/3083* (2013.01); *G02B 5/04* (2013.01); *G02B 5/0883* (2013.01); *G02B 5/20* (2013.01); *G02B 2006/12116* (2013.01)

(58) Field of Classification Search
CPC ...... G02B 5/3083; G02B 5/04; G02B 5/0883; G02B 5/20; G02B 5/3008; G02B 5/3016; G02B 5/30; G02B 5/3025; G02B 2006/12116; G02B 27/28; G02B 27/286; G02F 1/00; G02F 1/0018; G02F 1/0063; G02F 1/35; G02F 1/01; G02F 1/0136; G02F 1/13363; G02F 1/3501; G02F 1/3507; G01N 21/21; H04B 10/2581; H04B 10/532; H04B 7/10; H04J 14/00; H04J 14/04; H04J 14/06; H04L 5/04
See application file for complete search history.

(56) References Cited

U.S. PATENT DOCUMENTS

2016/0077261 A1* 3/2016 Arbabi .................. G02B 5/021
359/493.01

OTHER PUBLICATIONS

Afanasev, et al., "Circular Dichroism of Twisted Photons in the Non-Chiral Atomic Matter", arXiv:1704.07495, 2017, 8 pgs.

(Continued)

*Primary Examiner* — Derek S. Chapel
*Assistant Examiner* — Adam W Booher
(74) *Attorney, Agent, or Firm* — Henry Patent Law Firm PLLC

(57) ABSTRACT

In a general aspect, optical beams are manipulated. In some cases, an optical device includes an inlet to receive a first beam, and one or more prism pairs. Each prism pair includes one or more birefringent gradients configured to transform the first beam into a second beam. The second beam is associated with a lattice of cells, where each cell includes a first portion and a second portion. The first portion is associated with a first orbital angular momentum (OAM) mode and a first polarization, and the second portion is associated with a second OAM mode and a second polarization.

24 Claims, 10 Drawing Sheets

(56) References Cited

OTHER PUBLICATIONS

Afanasev, et al., "High-multipole excitations of hydrogen-like atoms by twisted photons near a phase singularity", Journal of Optics 18, 074013, 2016, 8 pgs.

Allen, et al., "Orbital angular momentum of light and the transformation of Laguerre-Gaussian laser modes", Phys. Rev. A 45, 8185, Jun. 1, 1992, 6 pgs.

Andersen, et al., "Quantized Rotation of Atoms from Photons with Orbital Angular Momentum", Physical Review Letters 97, 170406, Oct. 2006, 4 pgs.

Barnett, et al., "Optical orbital angular momentum", Philosophical Transactions of the Royal Society A 375, Jan. 2017, 9 pgs.

Bazhenov, et al., "Laser beams with screw dislocations in their wavefronts", Pisma v Zhurnal Eksperimentalnoi i Teoreticheskoi Fiziki 52, 1037, Oct. 1990, 3 pgs.

Berry, M. V., "The Adiabatic Phase and Pancharatnam's Phase for Polarized Light", Journal of Modern Optics, 1987, 8 pgs.

Brullot, et al., "Resolving enantiomers using the optical angular momentum of twisted light", Science advances 2, e1501349, Mar. 2016, 6 pgs.

Clark, et al., "Controlling neutron orbital angular momentum", Nature 525, 504, 2015, 7 pgs.

Cory, et al., "Chemical-Shift-Resolved Back-Projection Imaging", Journal of Magnetic Resonance, 1989, 9 pgs.

Courtial, et al., "Angular momentum of optical vortex arrays", Optics Express 14, 938, 2006, 12 pgs.

Eckel, et al., "Hysteresis in a quantized superfluid 'atomtronic' circuit", Nature, Feb. 13, 2014, 5 pgs.

Friese, et al., "Optical angular-momentum transfer to trapped absorbing particles", Physical Review A 54, 1593, Aug. 1996, 4 pgs.

Garces-Chavez, et al., "Simultaneous micromanipulation in multiple planes using a self-reconstructing light beam", Nature 419, 145, 2002, 3 pgs.

Harris, et al., "Structured quantum waves", Nature Physics 11, 629 (2015), 2015, 6 pgs.

He, et al., "Direct Observation of Transfer of Angular Momentum to Absorptive Particles from a Laser Beam with a Phase Singularity", Physical Review Letters 75, 826, Jul. 31, 1995, 6 pgs.

Karimi, et al., "Efficient generation and sorting of orbital angular momentum eigenmodes of light by thermally tuned q-plates", Applied Physics Letters 94, 231124, 2009, 4 pgs.

Karimi, et al., "Spin-to-Orbital Angular Momentum Conversion and Spin-Polarization Filtering in Electron Beams", Physical Review Letters, PRL 108, 044801, Jan. 2012, 5 pgs.

Kurzynowski, et al., "Optical vortices generation using the Wollaston prism", Applied Optics, vol. 45, No. 30, Oct. 2006, 6 pgs.

Kurzynowski, et al., "Regular lattices of polarization singularities: their generation and properties", Journal of Optics 12, 035406, Mar. 8, 2010, 9 pgs.

Levitt, "Symmetry-Based Pulse Sequences in Magic-Angle Spinning Solid-State NMR", Composite pulses (Wiley Online Library), 2002, 32 pgs.

Mair, et al., "Entanglement of the orbital angular momentum states of photons", Nature 412, 313, 2001, 4 pgs.

Marrucci, et al., "Optical Spin-to-Orbital Angular Momentum Conversion in Inhomogeneous Anisotropic Media", Phys. Rev. Lett. 96, 163905, 2006, 4 pgs.

Marrucci, et al., "Spin-to-orbital conversion of the angular momentum of light and its classical and quantum applications", Journal of Optics 13, 064001, 2001, 14 pgs.

Masajada, et al., "Creation of vortex lattices by a wavefront division", Optics express 15, 2007, 12 pgs.

Maurer, et al., "Tailoring of arbitrary optical vector beams", New Journal of Physics 9, 78, Mar. 30, 2007, 21 pgs.

McMorran, et al., "Electron Vortex Beams with High Quanta of Orbital Angular Momentum", science 331, 192, 2011, 5 pgs.

Milione, et al., "4 x 20 Gbit/s mode division multiplexing over free space using vector modes and a q-plate mode (de)multiplexer", Optics letters 40, May 1, 2015, 4 pgs.

Molina-Terriza, et al., "Twisted photons", Nature Physics 3, 305, May 2007, 6 pgs.

Naidoo, et al., "Controlled generation of higher-order Poincare sphere beams from a laser", Nature Photonics 10, 327, Mar. 2016, 7 pgs.

Nsofini, et al., "Spin-orbit states of neutron wave packets", Physical Review A94, 013605, 2016, 5 pgs.

Padgett, et al., "Tweezers with a twist", Nature Photonics 5, 343, 2011, 6 pgs.

Pancharatnam, et al., "Generalized Theory of Intererence, and Its Applications", Proceedings of the Indian Academy of Sciences—Section A, vol. 44, 1956, 16 pgs.

Rubinsztein-Dunlop, et al., "Roadmap on structured light", Journal of Optics, 2016, 52 pgs.

Sarenac, et al., "Holography with a neutron interferometer", Optics Express 24, 22528, Oct. 2016, 8 pgs.

Schmiegelow, et al., "Transfer of optical orbital angular momentum to a bound electron", Nature communications 7, Oct. 3, 2016, 6 pgs.

Siviloglou, et al., "Observation of Accelerating Airy Beams", Physical Review Letters 99, 213901, Nov. 2007, 4 pgs.

Sodickson, Aaron, et al., "A generalized k-space formalism for treating the spatial aspects of a variety of NMR experiments", Progress in Nuclear Magnetic Resonance Spectroscopy 33, pp. 77-108, 1998, 32 pages.

Tung, et al., "Observation of Vortex Pinning in Bose-Einstein Condensates", Physical Review Letters 97, 240402, Dec. 2006, 4 pgs.

Uchida, et al., "Generation of electron beams carrying orbital angular momentum", nature 464, 737, Apr. 2010, 3 pgs.

Vyas, et al., "Interferometric optical vortex array generator", Applied optics 46, 2893, 2007, 6 pgs.

Wang, et al., "Terabit free-space data transmission employing orbital angular momentum multiplexing", Nature Photonics 6, 488, 2012, 9 pgs.

Wei, et al., "Generation of optical vortex array based on the fractional Talbot effect", Optics Communications 282, 2665, 2009, 5 pgs.

Yao, et al., "Orbital angular momentum: origins, behavior and applications", Adv. Opt. Photon 3, 161, 2011, 44 pgs.

Zhang, et al., "Analysis of homonuclear RF gradient NMR spectroscopy", Molecular Physics 86, 347, 1995, 13 pgs.

Sarenac, et al., "Generation of a Lattice of Spin-Orbit Beams via Coherent Averaging", Physical Review Letters 121, 183602, Oct. 30, 2018, 6 pgs.

* cited by examiner

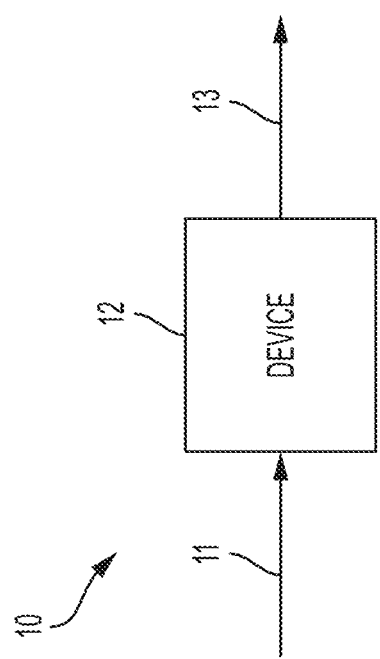

GENERATING A LATTICE OF OPTICAL SPIN-ORBIT BEAMS

CROSS-REFERENCE TO RELATED APPLICATIONS

This application claims priority to U.S. Provisional Application No. 62/542,969, filed Aug. 9, 2017, and entitled "Generating a Lattice of Optical Vortex Beams," which is hereby incorporated by reference.

BACKGROUND

The following disclosure relates to generating a lattice of optical beams in which the spin and orbital angular momentum are coupled.

Experiments have demonstrated structured waves of light and quantum particles, where a wavefront is patterned to attain nontrivial propagation characteristics. For example, beams of light, atoms, neutrons and electrons can carry orbital angular momentum parallel to their propagation axis.

DESCRIPTION OF DRAWINGS

FIG. 1A is a schematic diagram of an optical system that includes an example device interacting with a beam.

DETAILED DESCRIPTION

Figure 1B:
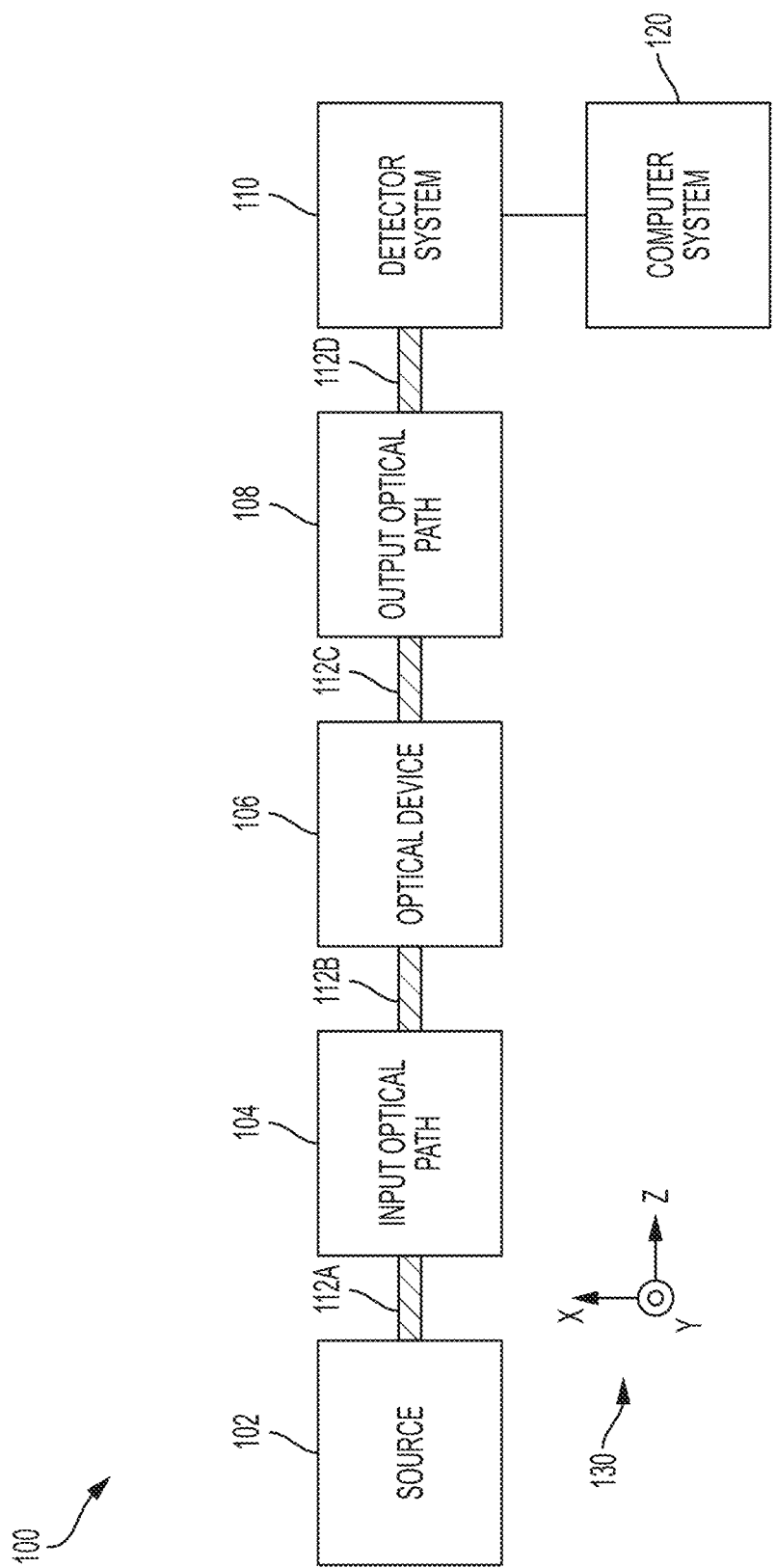
FIG. 1B is a schematic diagram of an example optical system.

In some aspects of what is described here, a system or device produces a lattice of optical vortex beams coupled to a two-level system. The two-level system can be, for example, the spin of a spin-1/2 particle or the polarization of light. In some implementations, an optical device produces a lattice of beams, where each beam is a cell of the lattice. For instance, the optical device may produce a lattice of polarization-orbit states, in which polarization states are coupled to respective orbital angular momentum (OAM) states in each cell of the lattice. In some examples, the orbital angular momentum (OAM) state of the beam varies within each cell of the lattice, the polarization state of the beam varies within each cell of the lattice, and the variations of the OAM state and the polarization state within each cell are correlated. The correlations, the lattice spacing, and other properties of the lattice can be controlled by the optical device that produces the lattice.

FIG. 1A is a schematic diagram of a system 10 that includes an example device 12 interacting with a beam. In this example, the device 12 receives an input beam 11 and transforms the input beam 11 into an output beam 13. In some examples, the input and output beams 11, 13 are beams of electrons, neutrons or other spin-1/2 particles. In some examples, the input and output beams are beams of light. In some examples, the input and output beams may include one or more photons.

When considering light beams, the input beam 11 can be polarized along one eigenstate of the two-level system. In some examples, the input beam 11 may be left-circularly polarized, and the input beam 11 may be a Gaussian beam. In other examples, the input beam 11 may be right-circularly polarized. In other examples, the input beam may be linearly polarized at a particular angle (e.g., 45 degrees). In the example shown in FIG. 1A, the input beam 11 carries no orbital angular momentum (OAM) and travels along the z-direction with wave vector $k_z=2\pi/\lambda$ and no mean transverse momentum $k_x=k_y=0$. Throughout this specification, $\lambda$ may represent the wavelength of the input beam 11.

The example device 12 can be an optical device that produces, from the input beam 11, a lattice of polarization coupled optical vortex beams in the output beam 13. The device 12 can include a number (N) of sets of Lattice of Optical Vortices (LOV) prism pairs. An LOV prism pair can include two perpendicular optical birefringent prisms, where one prism has the optical axis along the prism incline and the second prism has the optical axis offset by 45°.

In some examples, the device 12 includes one or more LOV prism pairs, and each LOV prism pair couples the polarization to the OAM according to the operator $U \sim (l_+ \sigma_+ + l_- \sigma_-)$, where $l_{+,-}$ and $\sigma_{+,-}$ are the OAM and Pauli raising and lowering operators. Each LOV prism pair may also possess translational symmetry, and hence the described coupling operation can be repeated in the form of a two-dimensional lattice. Each LOV prism pair can modify the transverse momentum of the beam such that the output beam possesses transverse momentum ($k_x=k_y=$constant). This deviation of the beam (caused by the prisms of the LOV prism pair) may be compensated for with the addition of an oppositely oriented non-birefringent prism after each prism of the LOV prism pair. In some examples, the non-birefringent prism may redirect the input beam 11 or the output beam 13 without altering the OAM of the respective beam or the polarization of the respective beam. This may allow for spatial displacement of the output beam 13, according to one or more design criteria.

In the example shown in FIG. 1A, the output beam 13 defines a lattice of polarization coupled optical vortex beams. Spatial properties of the lattice (e.g., the lattice spacing, lattice period, or lattice constant) can be controlled via the angle and birefringence of the prisms according to the equation $\alpha=\lambda/(\Delta n^* \tan[\theta])$, where $\Delta n$ and $\theta$ are the birefringence and the prism incline of the LOV prism pairs. Throughout the specification, a represents the lattice constant or the lattice period. The lattice constant or the lattice period may be associated with the spacing of the lattice (e.g., distances between the lattice cells). For example, a first lattice constant or period may result in a 1 μm spacing between cells of the lattice. This lattice period may be obtained by, for example, having a wavelength $\Delta$ of 532 nm input beam 11 and an incline angle $\theta$ of 60 degrees. This example may be associated with an LOV prism pair fabricated from $TiO_2$ and a birefringence of approximately 0.29. In a different example, having a degree of incline that is 30 degrees may produce a second lattice constant or a second lattice period a that is 3 μm. For example, the spacing between the lattice cells may be 3 μm.

In some implementations, in each lattice cell, one polarization state is coupled to OAM=0 while the other (orthogonal) polarization state is coupled to OAM=±1. To go beyond the OAM=±1, the device 12 could repeatedly apply the sequence: N sets of LOV prisms followed by a right-circular polarization filter (to filter the polarization state coupled to OAM≠0), followed by a half wave-plate. The phase profile of the beam postselected on the polarization state coupled to OAM≠0 is independent of the number (N) of LOV prism pairs:

$$\arg(\langle \circlearrowleft \mid \Psi_{LOV}^N \rangle) = -\tan^{-1}\left[\cot\left(\frac{\pi y}{a}\right)\tan\left(\frac{\pi x}{a}\right)\right].$$

However, in a lattice cell, the number of well-defined intensity rings is equal to N/2 in this example. Therefore, N provides control over the radial quantum number in a lattice cell. In some examples, N may provide control over the intensity patterns within the lattice or within the lattice cells. In some examples, this allows for control over the intensity patterns in a manner that is independent of the polarization pattern. However, as described herein, this may be achieved via linear passive devices.

FIG. 1B is a schematic diagram of an example optical system 100. The optical system 100 includes a source 102, an input optical path 104, an optical device 106, an output optical path 108, a detector system 110 and a computer system 120. The optical system 100 processes the optical beams 112A, 112B, 112C, 112D, which can be described with respect to the coordinate axes 130.

The example optical device 106 includes an optical birefringent path and configured to produce beams (e.g., the optical beam 112C) having a two-dimensional lattice of orbital angular momentum (OAM) states coupled to the polarization degree of freedom. The optical device 106 may be implemented according to the examples shown in FIG. 2, 3, 4 or 5, or the optical device 106 may be implemented in another manner.

In some cases, the optical device 106 can be operated in a manner to control and vary the lattice period, orbital quantum number, radial quantum number, beam displacement, and the correlations between the OAM and the polarization. Some example optical device include N sets of birefringent linear gradients, where the linear gradients are perpendicular to each other in real space; and the birefringence direction of each gradient is perpendicular (on the Poincare sphere) to the other gradient and the polarization of the incoming light.

In some examples, the source 102 may be an optical beam generator or photon generator. The optical beam generator may produce a polarized optical beam (e.g., left-circularly polarized, right-circularly polarized, or other). In some cases, the source 102 may produce a non-polarized optical beam, and the non-polarized optical beam may pass through a polarizer (not shown) to produce the polarized optical beam. The source 102 may direct the optical beam 112A of the source 102 to the input optical path 104. In some examples, the optical beam may be directed via passive elements in free space. For example, the optical beam may be directed by mirrors, waveguides or the like. The optical beams 112B, 112C, 112D may be directed in a similar manner. In some examples, the optical path of the optical beams 112A, 112B, 112C, 112D may include optical fiber elements or the like.

Figure 2:
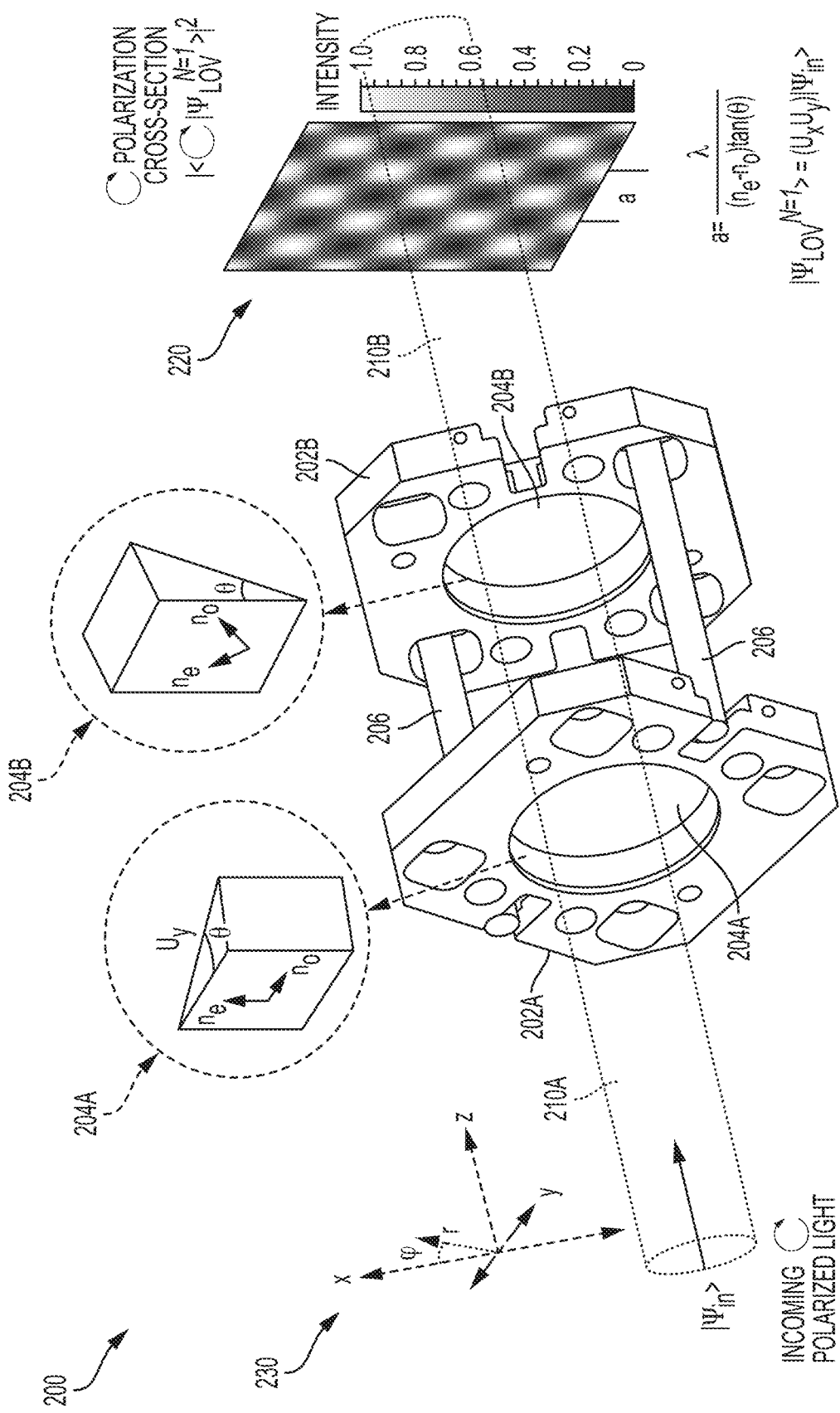
FIG. 2 includes a perspective view of an example optical device.

In some implementations, the birefringent optical path in the optical device 106 directs the circularly polarized light through one or more Lattice of Optical Vortex (LOV) prism pairs, where each LOV prism pair includes one prism with an optical axis along the prism incline and a second prism with an optical axis offset by 45'. FIG. 2 is a perspective view of an example optical device that includes a single LOV prism pair. In some examples, the optical device 106 may further include non-birefringent prisms responsible for redirecting the optical beam spatially. For example, the non-birefringent prisms may offset any spatial displacement or shift caused by the birefringent prisms. In turn, the output optical path 108 may direct the output beam of optical device 106 to a detector system 110 for analysis by computer system 120.

FIG. 2 includes a perspective view of an example optical device 200. In the example shown in FIG. 2, the beam profile 220 shows a lattice with a vortex-antivortex structure where both polarization states are similarly coupled to the OAM, and both $l_z=1$ and $l_z=-1$ phase structures are illuminated. In this example, the lattice period is given by a lattice period $$a = \frac{\lambda}{\Delta n \tan(\theta)},$$

where λ represents a wavelength of the incoming light, Δn represents a birefringence of the first and second optical birefringent prisms, and θ represents the angle of incline of the LOV prisms. Thus, the prism material and incline angle determine the lattice period in the example shown.

In the depicted example, the optical component 202A may house or optically behave as the prism 204A. Similarly, optical component 202B may house or optically behave as prism 204B. The optical components 202A and 202B may be separated via spacers 206 at a pre-defined distance. The prisms 204A and 204B may have different alignment as shown in FIG. 2. However, in the depicted example prisms 204A and 204B have the same angle of incline. The incoming polarized light, shown as the input beam 210A, may pass through each of prisms 204A and 204B respectively. The output beam 210B may then create the beam profile 220. The beam profile 220 may be a lattice of cells as described herein. The lattice of cells may have a varying intensity profile and a varying polarization profile. In some examples, additional LOV prism pairs that are similar to the depicted LOV prism pairs may be added. Element 230 shows a three-dimensional axis relative to the positioning of the LOV prism pairs.

In some implementations, the number of well-defined intensity rings in any lattice cell is equal to N/2. In such cases, the number of LOV prism pairs determines the radial quantum number. In some examples, the lattice cells may include semi ring shapes, elliptical rings, circular rings, squares or the like. FIG. 5 is a perspective view of another example optical device, which includes N=2 sets of LOV prism pairs. FIG. 5 will be described in more detail below.

In the example shown in FIG. 2, the first optical birefringent prism 204A has two exterior surfaces (first and second exterior surfaces) that that form the angle of incline θ along a first direction (the y-direction in the example shown), and the second optical birefringent prism 204B has two exterior surfaces (third and fourth exterior surfaces) that form the same angle of incline θ along a second direction (the x-direction in the example shown) that is substantially perpendicular to the first direction. The input beam 210A passes through the first, the second, the third, and the fourth exterior surfaces to form the output beam 210B. As shown in FIG. 2, the first optical birefringent prism 204A has its optical axis ($n_o$) at a first orientation (the y-direction in the example shown), and the second optical birefringent prism 204B has its optical axis ($n_o$) at a second orientation (halfway between the x-direction and y-direction in the example shown) that is offset from the first orientation by an offset angle. The offset angle is 45 degrees in the example shown. In some cases, each prism pair in the birefringent optical path (e.g., the first prism pair 503A and the second prism pair 503B in FIG. 5) defines a similar set of exterior surfaces and a similar set of optical axes.

Figure 3:
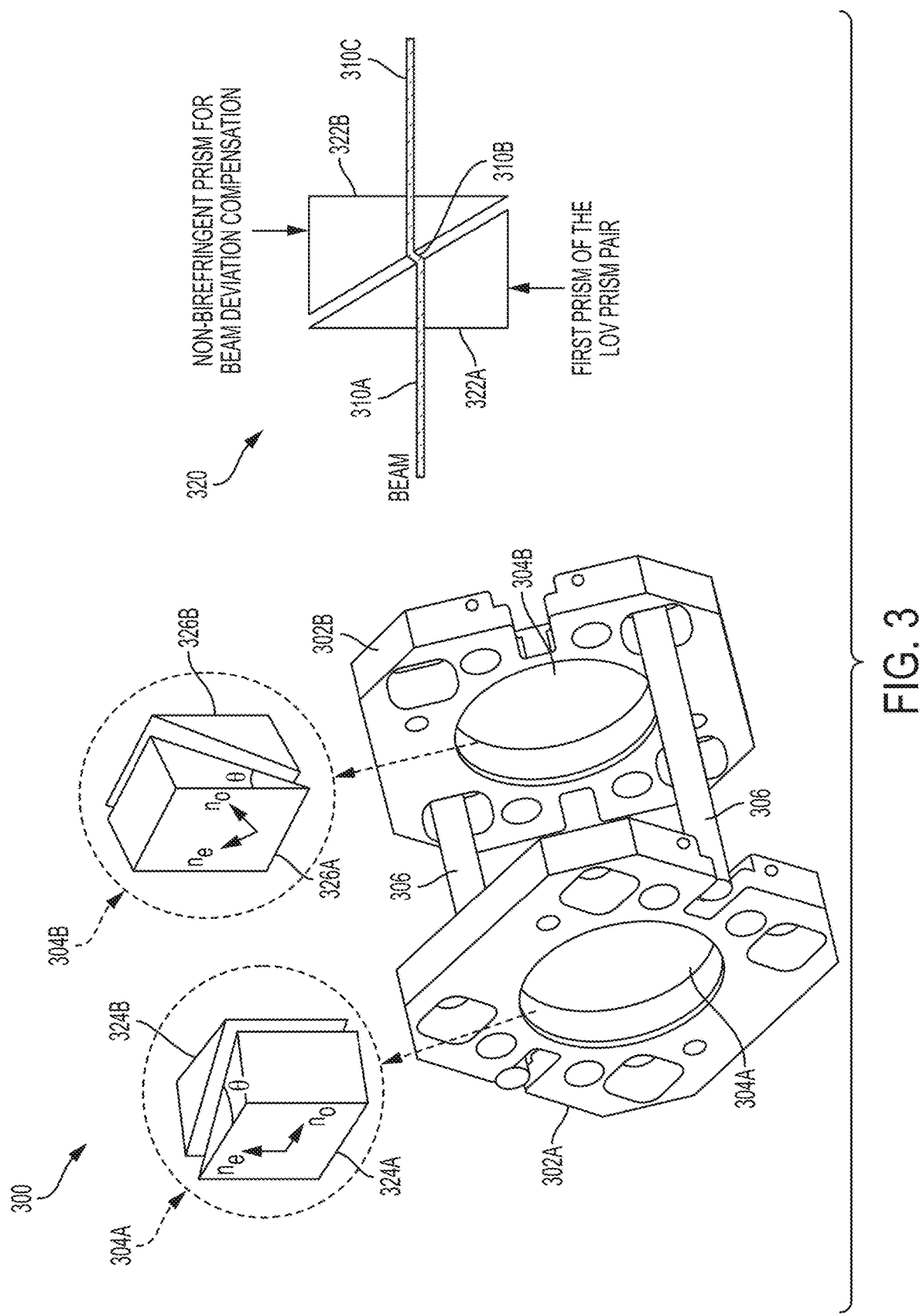
FIG. 3 includes a perspective view of another example optical device.

In some implementations, the deviation of the beam by the prisms of the LOV prism pair may be compensated for with the addition of an oppositely oriented non-birefringent prism after each prism of the LOV prism pair. FIG. 3 is a perspective view of an example optical device 300 that includes an additional prism for beam deviation compensation.

In the depicted example, the optical component 302A may house or optically behave as the prisms 304A. Similarly, optical component 302B may house or optically behave as the prisms 304B. The optical components 302A and 302B may be separated via spacers 306 at a pre-defined distance. The prisms 304A include a first prism 324A that is birefringent and a second prism 324B that non-birefringent; similarly, the prisms 304B include a first prism 326A that is birefringent and a second prism 326B that non-birefringent. The birefringent prisms 324A and 326A in FIG. 3 have the same alignment as the birefringent prisms 204A, 204B shown in FIG. 2.

In the example shown in FIG. 3, the two optical non-birefringent prisms 324B, 326B are each associated with a respective one of the two optical birefringent prism 324A, 326A and compensate for spatial beam displacement caused by the associated optical birefringent prism 324A, 326A. The non-birefringent prism 324B may redirect the optical beam passing through prisms 304A without altering the intensity profile of the beam and without altering the polarization profile of the beam. The non-birefringent prism 326B may redirect the optical beam passing through prisms 304B without altering the intensity profile of the beam and without altering the polarization profile of the beam. In the depicted example, prisms 324A, 324B, 326A and 326B each have the same angle of incline. Each optical non-birefringent prism 324B, 326B has exterior surfaces that form the angle of incline θ, and each optical non-birefringent prism is oriented in a direction opposite to a direction of the associated optical birefringent prism 324A, 326A. As shown in FIG. 3, the non-birefringent prism 324B is oriented with its angle of incline in the opposite direction of the associated birefringent prism 324A; similarly, the non-birefringent prism 326B is oriented with its angle of incline in the opposite direction of the associated birefringent prism 326A.

System 320 in FIG. 3 depicts a beam passing through a birefringent prism 322A and a non-birefringent prism 322B. The input beam 310A first passes through birefringent prism 322A which may alter the intensity or polarization profile of the input beam. The first output beam 310B, from the birefringent prism 322A, then passes through the non-birefringent prism 322B. The non-birefringent prism 322B then redirects the first output beam 310B to produce a second output beam 310C without altering the intensity or polarization profile of the beam. In some examples, the second output beam 310C may be substantially parallel to the input beam 310A, as depicted.

Figure 4:
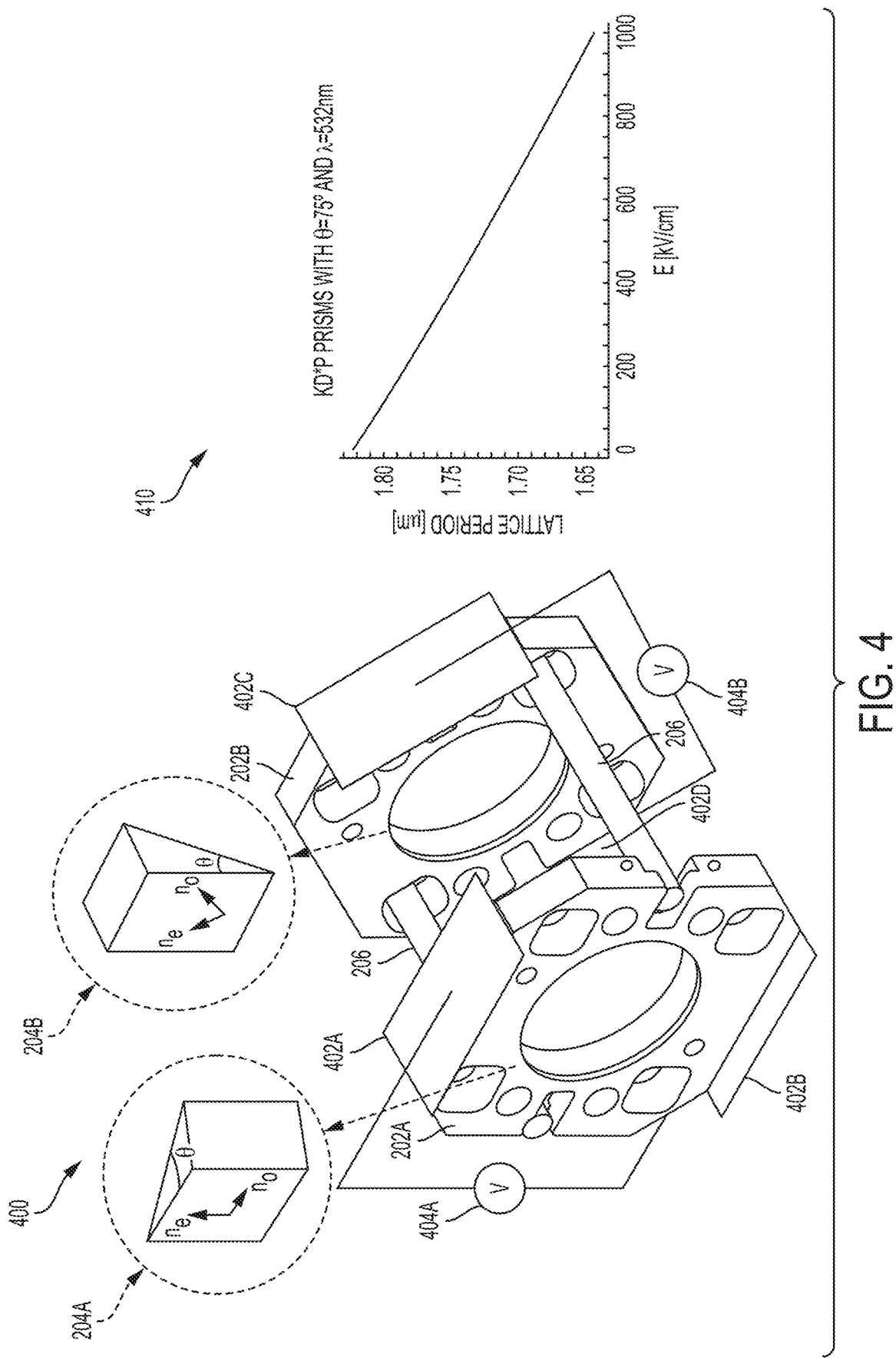
FIG. 4 includes a perspective view of another example optical device.

According to Pockel's effect, the birefringence of an optical medium (e.g., a prism) can be varied by applying an external electric field onto the medium. Therefore, if birefringent materials that exhibit Pockel's effect are used (ex KD*P), then with the addition of external electric field control, a variable lattice period may be obtained via the electro-optic effect. In some implementations, a constant field may be applied onto the optical medium. In other implementations, a variable field may be applied to the optical medium. Capacitors may be used to produce a varying electric field. In some implementations, the birefringence may be proportional to the applied electric field. FIG. 4 is a perspective view of an example optical device 400 that may include capacitors to produce an electric field along the direction of the optics axis.

In the depicted example in FIG. 4, optical component 202A houses prism 204A. In other examples, optical component 202A may house prisms 304A. Electrodes 402A and 402B may be configured to receive an electric signal produced by voltage source 404A, in order to apply a voltage or an electric filed across prism 204A. In some examples, the voltage source 404A may produce a fixed electrical signal. In some examples, the voltage source 404A may produce a variable electrical signal. In some examples, the voltage source 404A may produce a fixed electrical signal that is used in conjunction with one or more capacitors to produce a variable voltage drop between electrodes 402A and 402B. In turn, the electric field produced by the electrical signal may modify the birefringence of prism 204A. In the case where optical component 202A houses prisms 304A, the electric field may have no or minimal effect on the non-birefringent prism 324B. However, the electric field when applied will modify the birefringence of the birefringent prism 324A.

Similarly, the optical component 202B in FIG. 4 houses prism 204B. In other examples, optical component 202A in FIG. 4 may house prisms 304B. Electrodes 402C and 402D may be configured to receive an electric signal produced by voltage source 404B, in order to apply a voltage or an electric filed across the prism 204B. In some examples, the voltage source 404B may produce a fixed electrical signal. In some examples, the voltage source 404B may produce a variable electrical signal. In some examples, the voltage source 404B may produce a fixed electrical signal that is used in conjunction with one or more capacitors to produce a variable voltage drop between electrodes 402C and 402D. In turn, the electric field produced by the electrical signal may modify the birefringence of prism 204B. In the case where optical component 202B houses prisms 304B, the electric field may have no or minimal effect on the non-birefringent prism 326B. However, the electric field when applied will modify the birefringence of the birefringent prism 326A. As shown in plot 410, the lattice period described above is inversely proportional to the applied electric field.

In some aspects of operation, the electrodes 402A, 402B, 402C, 402D are configured to receive an electrical signal that generates an external electric field across at the respective optical birefringent prisms 204A, 204B. In response to receiving the electrical signal, the lattice period of the output beam is changed (e.g., increased or decreased). For example, the lattice period may change in response to the electrical signal in the manner shown by the plot 410 in FIG. 4.

Figure 5A:
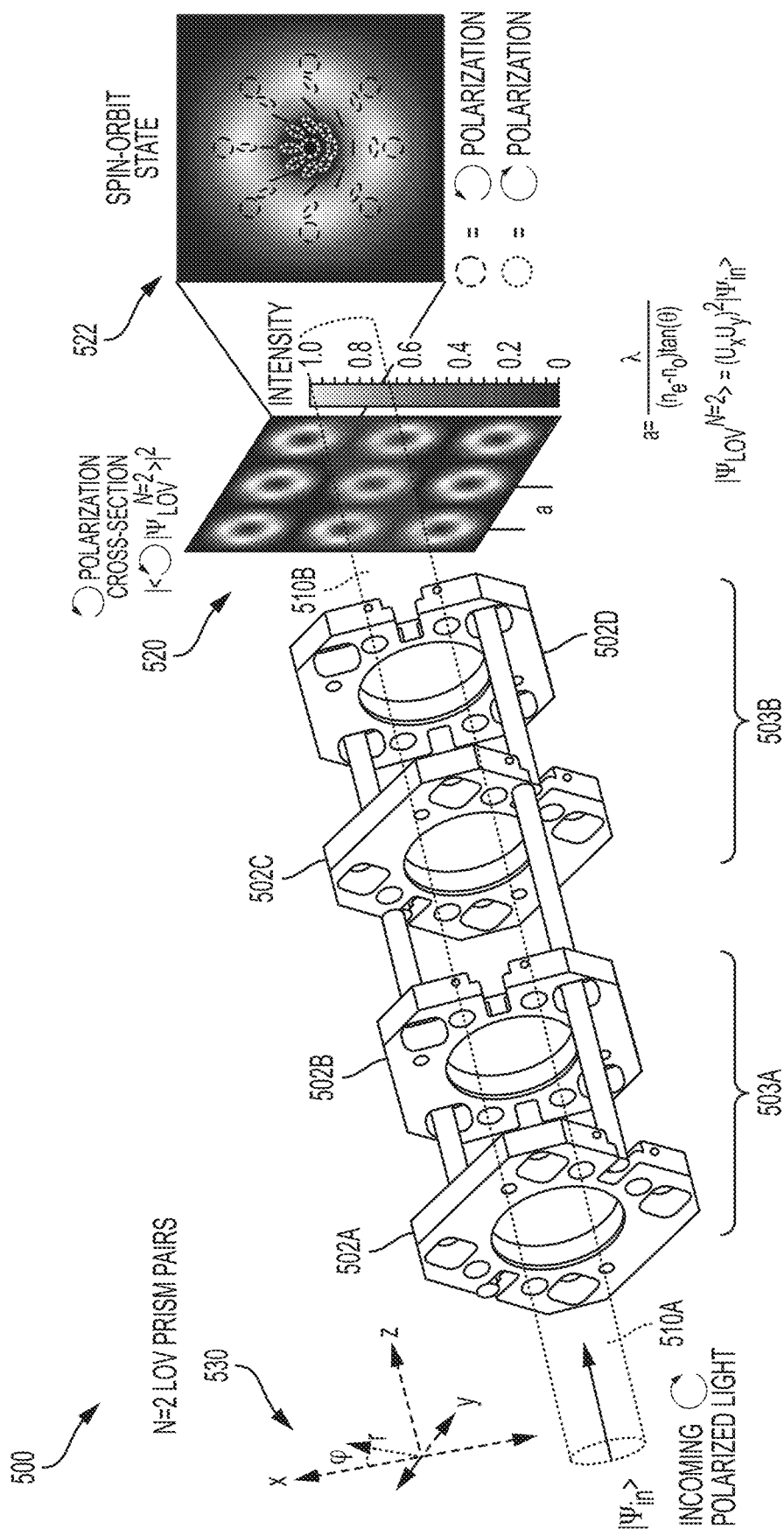
FIG. 5A includes a perspective view of another example optical device.

FIG. 5A includes a perspective view of another example optical device 500. The depicted example includes a first prism pair 503A and a second prism pair 503B. Therefore, in the depicted example, N=2. In some implementations, the number of well-defined intensity rings in any lattice cell is equal to N/2. In this example, the number of well-defined rings is 1. In a different example, where N=4, the number of well-defined rings is 2. Higher values of N may be used.

Figure 5B:
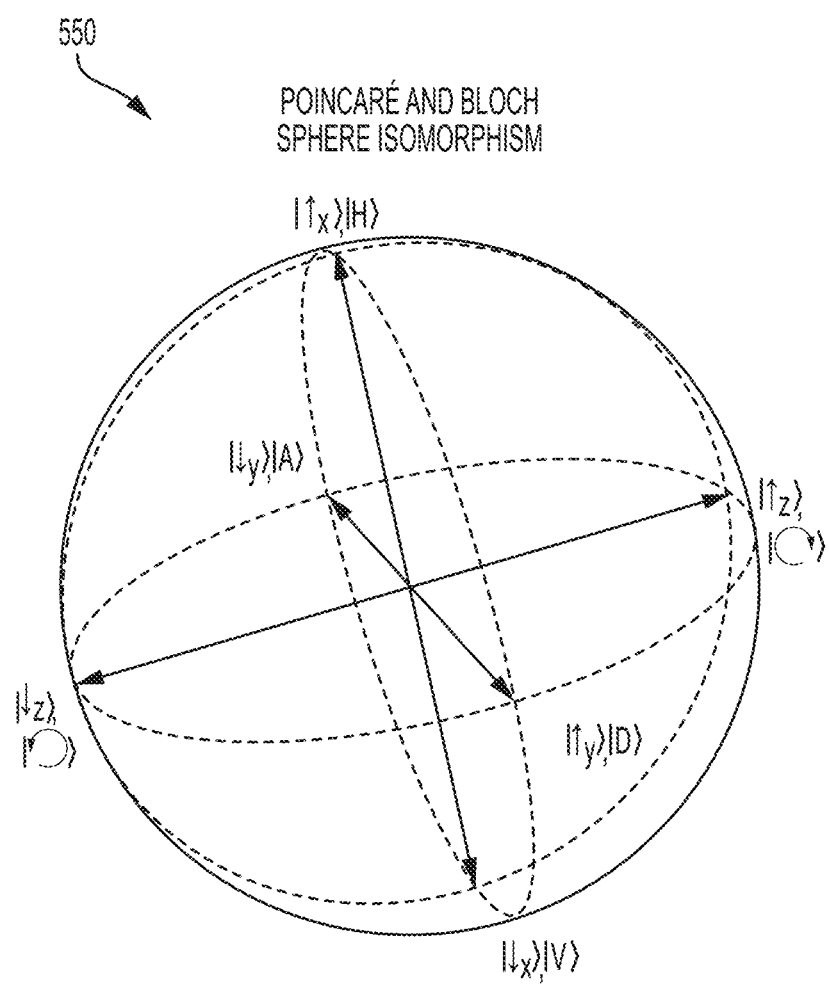
FIG. 5B shows coordinate axes for the optical device shown in FIG. 5A.

The first prism pair 503A may include optical component 502A for housing a first birefringent prism and optical component 502B for housing a second birefringent prism oriented as described herein. Similarly, the second prism pair 503B may include optical component 502C for housing a third birefringent prism and optical component 502D for housing a fourth birefringent prism oriented as described herein. In some examples additional prism pairs may be included in a similar manner. The three-dimensional coordinate axes 530 are shown relative to the orientations of the LOV prism pairs. An incoming circularly polarized beam, shows as input beam 510A, passes through prism pairs 503A and 503B to produce output beam 510B and beam profile 520. Each cell 522 of the beam profile 520 includes a single well-defined ring and a central polarization that is orthogonal to an outer ring polarization. FIG. 5B shows coordinate axes 550 that depict a Poincare' and Bloch sphere, in alignment with the axes 530 in FIG. 5A depicting a plurality of polarization states. FIG. 5B shows the isomorphism between the Bloch sphere representing the spin states of fermions $\{\uparrow_x, \downarrow_x, \uparrow_y, \downarrow_y, \uparrow_z, \downarrow_z\}$ and that of the Poincaré sphere representing the polarization states of light {H, V, D, A, ↻, ↺}. The corresponding eigenvectors can be chosen as shown to ensure that (r, φ) are the transverse coordinates of the incoming beam.

In some implementations, an optical system includes a sequence of optical elements, for example, LOV prism pairs followed by a π rotation along $\sigma_z$ (which may be realized via a material exhibiting circular birefringence) followed by LOV prism pairs. For example, an optical rotator may be placed between prism pairs 503A and 503B. This shifts the lattice cells of the outgoing beam from being centered on $l_z=1$ phase structures to $l_z=-1$. Applying a polarization filter after the LOV prism pairs and reapplying the LOV prism pair sequence again can result in the incremental change in the OAM values, thereby providing control of the orbital quantum number and in turn the lattice period.

Figure 6:
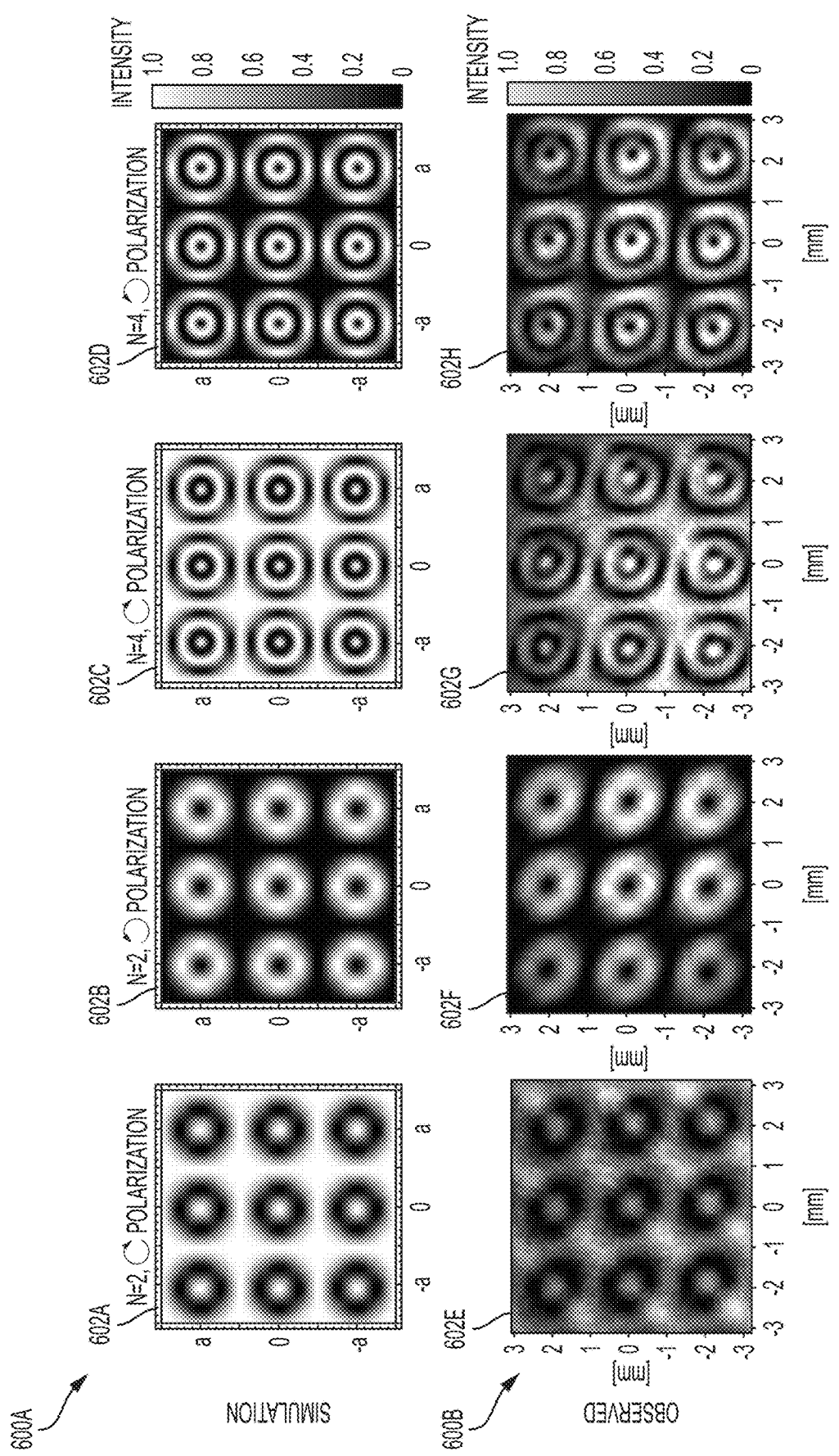
FIG. 6 is a collection of plots showing observed and simulated data for an example optical device.

FIG. 6 is a collection of plots showing observed and simulated data for an example optical device. Elements 600A depict the simulated lattice results and elements 600B depict the experimental results. Elements 602A and 602E include a single ring because they are associated with N=2 example and a right circular polarization. Elements 602B and 602F are the inverse of elements 602A and 602E since they are associated with N=2 and a left circular polarization. Elements 602C and 602G include two rings since they are associated with N=4 and right circular polarization. Finally, elements 602D and 602H are the inverse of 602C and 602G since they are associated with N=4 and left circular polarization. With respect to the setup associated with FIG. 6, a 2° quartz LOV prism sets were used with an input laser wavelength that is 532 nm to produce a=1.68 mm.

In some aspects of operation, a system (e.g., the system 10 in FIG. 1A, the optical system 100 shown in FIG. 1B, or another type of system) or a device (e.g., the optical device 200 shown in FIG. 2, the optical device 300 shown in FIG. 3, the optical device 400 shown in FIG. 4, the optical device 500 shown in FIG. 5A, or another type of device) transforms a first beam (e.g., an input beam in a first state) into a second beam (e.g., an output beam in a second state). For example, the optical device 200 transforms the input beam 210A into the output beam 210B; the optical device 500 transforms the input beam 510A into the output beam 510B.

In some aspects of operation, the first beam is associated with a first orbital angular momentum (OAM) mode and a first polarization mode. In the examples shown in FIG. 2 and FIG. 5A, the input beam (210A, 510A) is associated with the zero radial mode (or equivalently, the $n_r=0$ mode), the zero OAM mode (or equivalently, the OAM=0 or l=0 mode) and the right-circular polarization; in other words, the input beam (210A, 510A) is associated with the $|\psi_{in}\rangle=|n_r=0, l=0, p=\circlearrowright\rangle$ state. The first OAM mode and a first polarization mode are defined over the full transverse range of the input beams 210A, 510A.

In some aspects of operation, the second beam is associated with a spatially periodic lattice structure in which each element in the periodic lattice structure includes a first portion and a second portion. For example, the beam profile 220 in FIG. 2 and the beam profile 520 in FIG. 5A show examples a two-dimensional lattice of cells, where each cell has a first portion and a second portion. The first portion in each cell has the first OAM mode and the first polarization, and the second portion in each cell has a second OAM mode and a second polarization. For instance, the first portion can have the zero OAM mode (or equivalently, the OAM=0 or l=0 mode) and right-circular polarization, and the second portion can have a non-zero OAM mode (e.g., the OAM=±1 or l=±1 mode) and left—circular polarization. As such, the first OAM mode is correlated with the first polarization, and the second OAM mode is correlated with the second polarization, such that the second beam has a spatially periodic structure of polarization modes coupled to OAM modes. In the examples, the first polarization is orthogonal to the second polarization.

In some aspects of operation, the first beam is transformed into the second beam by a number of prism pairs in an optical path. For example, the birefringent optical path in the optical device 106 in FIG. 1B includes a number of prism pairs that transform the optical beam 112B into the optical beam 112C. Each of the prism pairs includes a two prisms having birefringent gradients along the optical path. For instance, the optical device 106 in FIG. 1B can include the birefringent prisms 204A, 204B in the optical device 200 shown in FIGS. 2 and 4, the birefringent prisms 324A, 326A in the optical device 300 shown in FIG. 3, the birefringent prisms in the optical components 502A, 502B, 502C, 502D shown in FIG. 5, or another configuration of prism pairs. In some cases, each cell in the lattice defined by the second beam is associated with a mean radial mode, and the mean radial mode is based on the number of prism pairs.

In some aspects of operation, in the spatially periodic structure of the second beam (e.g., the two-dimensional lattice of cells) includes periodically-spaced cells, where each neighboring pair of cells is separated by a lattice period. As such, each cell in the lattice is offset from a number of neighboring cells by the lattice period. For example, in a square lattice defined over the xy-plane, a first cell may be offset from a second cell by a certain distance (the lattice period) in a first lattice direction (e.g., the +x-direction), the first cell may also be offset from a third cell by the same distance in a second lattice direction (e.g., the +y-direction), the first cell may also be offset from a fourth cell by the same distance in a third lattice direction (e.g., the −x-direction), and the first cell may also be offset from a fifth cell by the same distance in a fourth lattice direction (e.g., the −y-direction). In the examples shown, the lattice period is proportional to a wavelength of the first beam, inversely proportional to a birefringence of the birefringent prisms, and inversely proportional to the tangent of the angle of incline. For instance, in a two-dimensional lattice of cells, the cells may be spaced apart from each other over the transverse range of the beam by a lattice period $$a = \frac{\lambda}{\Delta n \tan(\theta)},$$

where $\lambda$ represents a wavelength of the beam, $\Delta n$ represents a birefringence of the first and second optical birefringent prisms, and $\theta$ represents the angle of incline.

Figure 7:
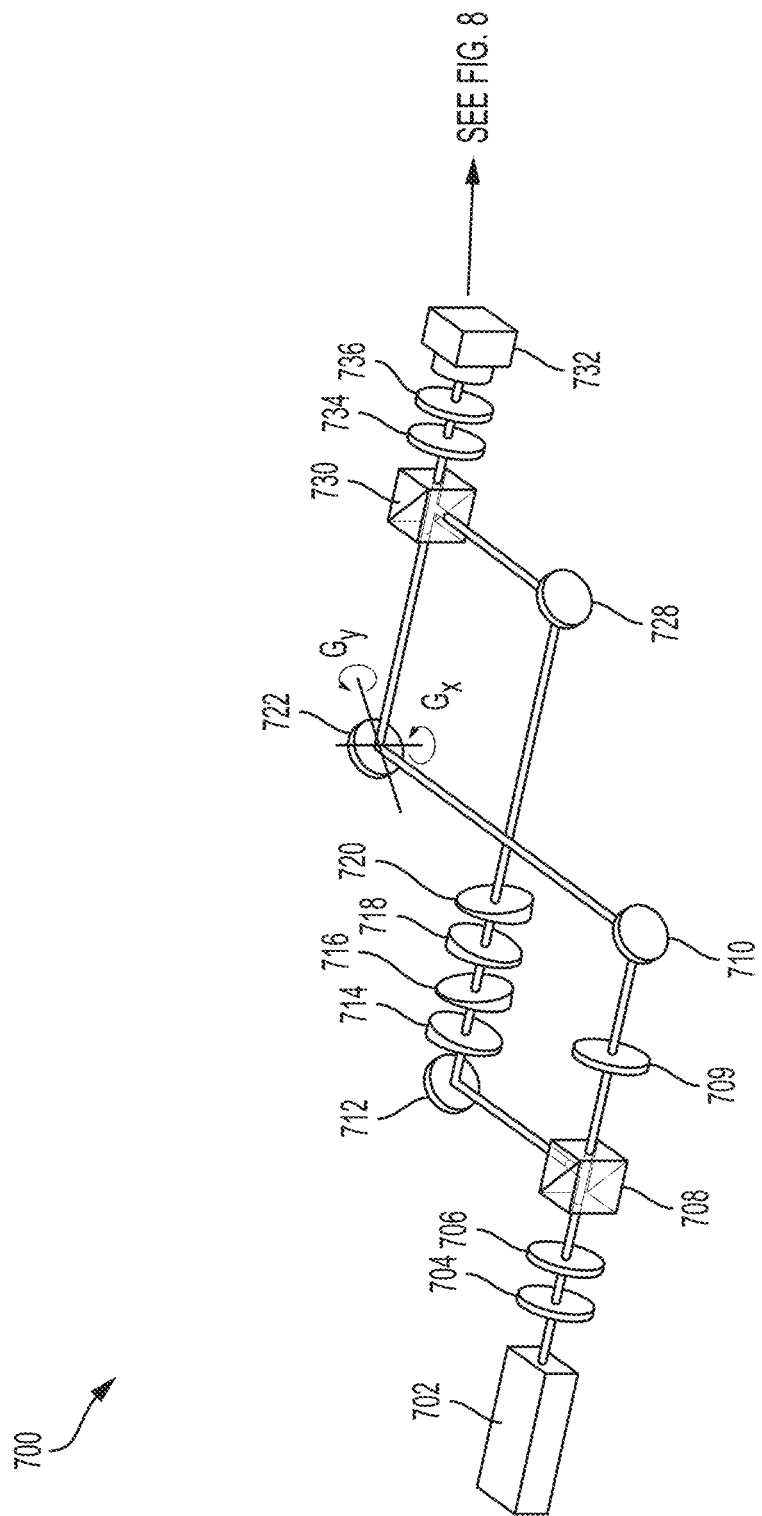
FIG. 7 includes a schematic diagram of an example optical system.

FIG. 7 includes a schematic diagram of an example optical system 700. The optical system 700 shown in FIG. 7 can be used to map out phase related information of the lattice beams. System 700 includes an optical beam generator 702. In some examples, the optical beam generator 702 may generate laser beam having a wavelength of 532 nm or another optical wavelength. In some examples, the laser may be associated with unpolarized light. The optical beam may travel in free space to polarizer 704. The polarizer 704 may polarize the laser beam to produce a polarized laser beam (e.g., left circularly polarized, right circularly polarized, linearly polarized or the like). In the depicted example, the polarizer may produce linearly polarized beam. In turn, the polarized laser beam may travel in free space to pass through quarter wave-plate 706. The quarter wave-plate 706 may produce circularly polarized beam from the linearly polarized beam. The optical beam may continue to propagate through the depicted path to reach beam splitter 708. The beam splitter 708 may split the input beam to produce two beams. In some examples, the beam splitter 708 may split the beam equally (e.g., 50%/50%). In other examples, the beam splitter may split the beam unequally (e.g., 60%/%40, 70%/30 or the like). In some examples, the properties of the output beams of the beam splitter 708 may be sustainably the same or similar to the property of the input beam to the beam splitter 708.

A first output beam (propagating to the left) of the beam splitter 708 reaches a mirror 712. The mirror 712 redirects the first output beam toward a prism 714 without altering the properties of the beam. Prisms 714 and 716 form a first LOV prism pair in accordance with the LOV prism pairs described herein. Prisms 718 and 720 form a second LOV prism pair in accordance with the LOV prism pairs described herein. The first output beam propagates through the two LOV prism pairs (714, 716, 718 and 720) wherein N=2. The first output beam then propagates in free space to reach a mirror 728. The mirror 728 redirects the first output beam to beam combiner 730.

A second output beam (propagating forward) of the beam splitter 708 reaches half wave-plate 709. The half wave-plate 709 rotates the polarization of the second output beam or shifts the polarization direction of the second output beam. For example, the half wave-plate 709 may change the polarization of the second output beam to an orthogonal polarization. The second output beam is then redirected by a mirror 710 and a tilted mirror 722 to reach the beam combiner 730.

Figure 8:
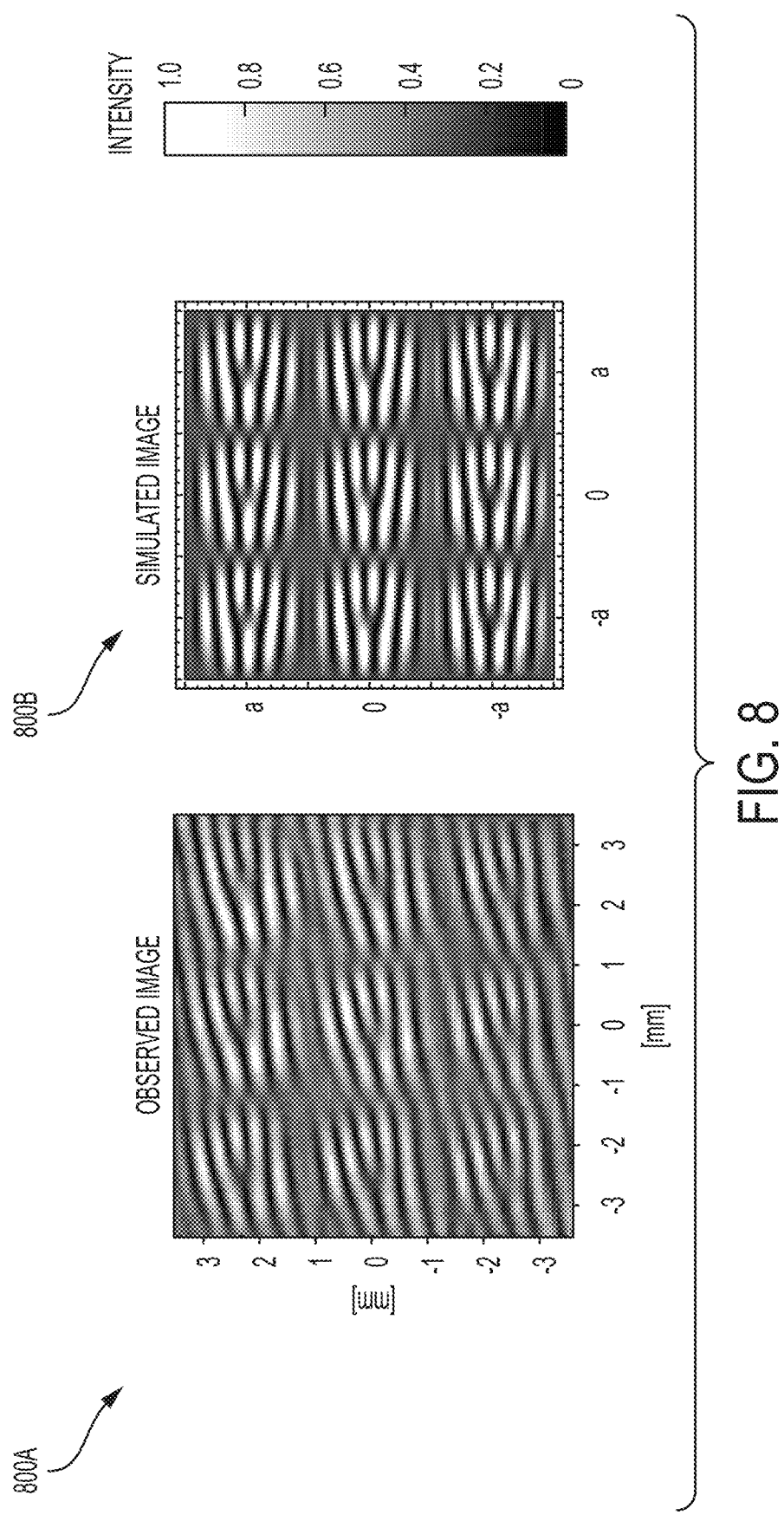
FIG. 8 is a collection of plots showing observed and simulated data for an example optical system.

The beam combiner 730 combines the first output beam with the second output beam to produce a resultant beam. The resultant beam then passes through a quarter wave-plate 734 and, in turn, a half wave-plate 736. The quarter wave-plate 734 and the half wave-plate 736 are generally similar to quarter wave-plate 706 and the half wave-plate 709, respectively. The output beam of half wave-plate 736 is then observed by camera 732 for analysis. FIG. 8 depicts the simulated image 800B and the experimental image 800A observed by the camera 732.

The systems and techniques described above can be used in a highly robust method, applicable to both electromagnetic and matter-wave beams, that can produce a beam containing a lattice of orbital angular momentum (OAM) states coupled to a two-level system. Efficient protocols can be used for controlling and manipulating the lattice characteristics. These protocols are applied in an experimental realization of a lattice of optical spin-orbit beams. The described techniques can be used to provide tools for investigations of chiral and topological materials with light and particle beams. The structured OAM waves may be used in a number of applications in microscopy, encoding and multiplexing of communications, and manipulation of matter. Spin-orbit beams, where an orbital degree of freedom is coupled to a two-level system such as polarization for light or spin for electrons and neutrons, may be used in applications of high resolution optical imaging, high-bandwidth communication, and optical metrology. Spin-orbit states of light beams may be achieved by an interferometric method using a spatial light modulator, or via q-plates.

The utility of the spin-orbit beams may be enhanced by producing a periodic lattice of such states, the lattice constants of which are matched to characteristic length scales of target materials. A universal parallel multiplexing technique that can produce a beam containing a lattice of OAM states coupled to a two-level system is described herein. Spin and polarization enter here as natural manifestations of the two degrees of freedom of light and spin-1/2 particles. This approach could be extended to systems with more degrees of internal freedom, such as atoms with higher spin.

To describe the protocols for creating and optimizing the lattices of spin-orbit beams, a single spin-orbit state may be analyzed. It is convenient to consider a (light or particle) wavepacket traveling along the z-direction with momentum $\hbar k z$ and expectation values of momentum in the transverse (x,y) plane equal to zero. When the transverse coherence lengths are equal $\sigma_x = \sigma_y \equiv \sigma_\perp$, where $\sigma_{x,y} = 1/(2\Delta k_{x,y})$, and $\Delta k_{x,y}$ are the x and y spreads of the wavepacket's transverse momentum distributions, the eigenstates in cylindrical coordinates $(r, \phi)$ can be expressed as follows:

$$|n_r, l, p\rangle = \mathcal{N}\xi^{|l|}e^{-\frac{\xi^2}{2}}\mathcal{L}_{n_r}^{|l|}(\xi^2)e^{il\phi}Z(z)|p\rangle$$

where $$\mathcal{N} = \frac{1}{\sigma_\perp}\sqrt{\frac{n_r!}{\pi(n_r + |l|)!}}$$

is the normalization constant, $\xi = r/\sigma_\perp$ is the dimensionless radial coordinate, $\phi$ is the azimuthal coordinate, $n_r \in \{0, 1, 2 \ldots\}$ is the radial quantum number, $l \in \{0, \pm 1, \pm 2 \ldots\}$ is the azimuthal quantum number, $L_{n_r}^{|l|}(\xi^2)$ are the associated Laguerre polynomials, $Z(z)$ is the longitudinal wavefunction, often approximated by a Gaussian wavepacket, and $p \in \{\circlearrowright, \circlearrowleft\}$ is the polarization state of light ($s \in \{\uparrow_z, \downarrow_z\}$ in the case of spin-1/2 particles may be used with reference to FIGS. 5A and 5B). Applying the OAM operator $$\hat{L}_z = -i\hbar \frac{\partial}{\partial \varphi}$$

shows that the wavepacket carries an OAM of $l\hbar$. The coherence length $\sigma_\perp$ is important when dealing with particle beams where the beam is generally an incoherent mixture of coherent wavepackets, whereas for light one may simply consider the beam waist and the Laguerre-Gaussian modes. However, although the polarization-orbit beam can cleanly be described via Laguerre-Gaussian modes, the beam carrying a lattice of polarization-orbit states cannot due to the translational symmetry.

When considering beams carrying OAM, there is a fixed axis in space about which the OAM is quantized. In the case of beams carrying a lattice of OAM states there is a two-dimensional array of such axes and what happens locally within each cell is of interest. Particularly, when the beam interacts with a material then the region around the local OAM axes becomes of higher importance.

The process of preparing states with coupled polarization and OAM may begin with generation of circularly polarized light, as follows:

$$|\psi_{in}\rangle = |0, 0, \circlearrowright\rangle$$

In turn a coupling operator may be applied, as follows:

$$\hat{U} = e^{i\frac{\pi r}{2r_c}[\cos(\phi)\hat{\sigma}_x + \sin(\phi)\hat{\sigma}_y]}$$
$$= \cos\left(\frac{\pi r}{2r_c}\right) II + i\sin\left(\frac{\pi r}{2r_c}\right)(\hat{l}_+\hat{\sigma}_- + \hat{l}_-\hat{\sigma}_+).$$

In this case, $\hat{l}_\pm = e^{\pm i\phi}$ are the raising and lowering OAM operators, $\hat{\sigma}_x$ and $\hat{\sigma}_y$ are the Pauli operators, and $\hat{\sigma}_\pm = (\hat{\sigma}_x \pm i\hat{\sigma}_y)/2$. The length $r_c$ is defined as the smallest radial distance at which the polarization degree of freedom undergoes a $\pi$-rotation. At radii different than $r = r_c$, other rotation angles will occur producing the spin-orbit state, as shown below:

$$|\Psi_{SO}\rangle = \frac{e^{-\frac{r^2}{2}}}{\sqrt{\pi}}\left[\cos\left(\frac{\pi r}{2r_c}\right)|\circlearrowright\rangle + ie^{i\phi}\sin\left(\frac{\pi r}{2r_c}\right)|\circlearrowleft\rangle\right],$$

In this case, we have set $\sigma_\perp = 1$. $|\Psi_{SO}\rangle$ describes a vector vortex beam where the OAM is induced via Pancharatnam-Berry geometrical phase. The polarization distribution and the intensity post-selected on the right circularly polarized light is depicted on the zoomed-in plot of FIG. 5A. There may be a correlation between the two degrees of freedom whereby post-selecting on one degree of freedom determines the value for the other, and that this correlation is maximized under the condition $r_c = 1.82 \sigma_\perp$.

The procedures described herein for producing a beam with a lattice of optical spin-orbit states utilize a sequence of linear birefringent gradients that are equal in magnitude and perpendicular to each other and the polarization axis of the incoming light. This procedure may be motivated by applying the Suzuki-Trotter expansion to the equation:

$$\hat{U} = e^{i\frac{\pi r}{2r_c}[\cos(\phi)\hat{\sigma}_x + \sin(\phi)\hat{\sigma}_y]}$$

The result is shown as follows:

$$e^{i\frac{\pi}{2r_c}(x\hat{\sigma}_x + y\hat{\sigma}_y)} = \lim_{N \to \infty}\left(e^{i\frac{\pi}{2r_c}x\hat{\sigma}_x/N}e^{i\frac{\pi}{2r_c}y\hat{\sigma}_y/N}\right)^N.$$

The above switches from radial to Cartesian coordinates, $x = r\cos(\phi)$ and $y = r\sin(\phi)$. Examining and truncating the right hand side of this relation, it can be interpreted as a sequence of N perpendicular linear gradients. Generalizing to put the origin of the gradients at $(x_0, y_0)$ and choosing that the gradients be independent of N. The operators may be defined as follows:

$$\hat{U}_x = e^{i\frac{\pi}{2r_c}(x-x_0)\hat{\sigma}_x}; \hat{U}_y = e^{i\frac{\pi}{2r_c}(y-y_0)\hat{\sigma}_y}.$$

In the case of photons, one way to produce the operators is via optical birefringent prisms as shown in FIG. 2 and FIG. 5B. Placing one prism with an optical axis along the prism incline and a second prism with an optical axis offset by 45° results in the product operation $\hat{U}_x \hat{U}_y$ to produce a "Lattice of Optical Vortices (LOV) prism pair" as described herein. The equation below shows that a physical shift by a distance, d, of a prism along its incline direction (x or y) results in a simple phase shift of $(d\pi/2r_c)$ around the corresponding axis. A sequence of N sets of LOV prism pairs generates a lattice of optical spin-orbit beams, calculated as $$|\Psi_{LOV}^N\rangle = (\hat{U}_x \hat{U}_y)^N |\psi_{in}\rangle.$$

This process is shown in FIG. 5A for N=2. The spin-orbit states in these lattices form a two-dimensional array with a lattice period of $$a = 2r_c = \frac{\lambda}{\Delta n \tan(\theta)}$$

where $\Delta n$ and $\theta$ are the birefringence and the incline angle of the LOV prism pairs. The OAM structure of the resulting beam can be analyzed by examining the phase profile of the polarization state which is correlated with the OAM:

$$\arg(\langle \circlearrowleft | \Psi_{LOV}^N\rangle) = -\tan^{-1}\left[\cot\left(\frac{\pi y}{a}\right)\tan\left(\frac{\pi x}{a}\right)\right].$$

By analyzing the equation below it can be observed that the lattice cells are centered on a $l_z = 1$ phase structure, while the lattice cell corners are on a $l_z = -1$ structure. Although the number (N) of LOV prism pairs does not affect the phase profile, in any lattice cell the number of well defined intensity rings is equal to N/2. Therefore, N provides control over the mean radial quantum number $n_r$ (the mean radial mode) in a lattice cell. In the N=1 case both polarization states are similarly coupled to the OAM, and both $l_z = 1$ and $l_z=-1$ phase structures are illuminated. Similar vortex-antivortex structures can also be obtained via Wollaston prisms.

The simulated and observed polarization profiles for N=2 and N=4 are plotted in FIG. 6, and are in a good agreement. For the LOV prism pairs the lattice period given by equation above is 1.68 mm, though it was measured to be slightly larger due to beam divergence.

The period of the lattice can span a large range. LOV prism pairs fabricated from $TiO_2$ (birefringence of ~0.29) with an incline angle of 60° would produce a lattice period of a ~1 μm for a light wavelength of 532 nm. Furthermore, if birefringent materials which exhibit the Pockel's effect are used then with the addition of external electric field control a variable period may be obtained via the electro-optic effect.

The doughnut structure in the spin-orbit states shown in FIG. 6 is indicative of the polarization profile of the polarization-orbit state and not due to the OAM structure. To show that there is a lattice of OAM states, the phase profile of the beam is measured using an interferometer. The schematic of the setup is shown in FIG. 7, where a linear phase gradient in one path has been introduced to observe the characteristic fork structure hologram indicative of OAM. A lattice of fork structures can clearly be seen, indicating an $l_z=1$ at each lattice center.

Lattices of $l_z=-1$ spin-orbit states may be obtained by orienting the first prism of the LOV prism pairs along the negative y-direction. While various sequences of LOV prism pairs and polarization filters may be used to achieve higher order OAM structures in the outgoing beam. For example, to increment the OAM values to which the polarization states are coupled to by an integer "m", the following sequence may be used:

$$\left((\hat{U}_x\hat{U}_y)^N|\circlearrowleft\rangle\langle\circlearrowleft|e^{-i\frac{\pi}{2}\hat{\sigma}_x}\right)^{m-1}(\hat{U}_x\hat{U}_y)^N|\psi_{in}\rangle$$

where $|\circlearrowleft\rangle\langle\circlearrowleft|$ is the operator for a polarization filter along the $|\circlearrowleft\rangle$ direction. Lastly, using LOV prism pairs which produce different lattice constants results in a "superlattice" which has an overlay of the distinct lattice constants.

The protocols described herein provide a two-dimensional control of the characteristic length scale of the single spin-orbit features. It may be possible to create a lattice of ring-shaped optical atomic traps. One can also envisage vortex pinning in Bose-Einstein condensates via these beams. Lattices of polarization coupled optical vortices may also be fruitful in microscopy or basic studies of the interaction of structured light with individual atoms or molecules. This is because OAM is defined with respect to a single axis perpendicular to the wavefront. Thus, in studies using a single OAM axis, only atoms or molecules in the region of a fraction of a wavelength about that axis are subject to the OAM selection rules. This technique extends such rules across a region proportional to the area of the fully-structured wavefront.

The techniques described herein may also be useful for matter-wave beams where the beam is generally an incoherent mixture of coherent wavepackets. In the case of spin-1/2 particles, to create a lattice of spin-orbit states one can use a magnetic prism set with the magnetic field along the direction of the prism incline, and where the prisms are perpendicular to each other and the spin state of the incoming particles. Matter-wave lattices of spin-orbit beams may thus be generated where the OAM axis is specified along the coherent wavepacket rather than the beam axis. This opens the door for new types of studies of chiral and topological materials via particle beams.

In some of the experimentations associated with FIG. 6, A laser of wavelength 532 nm was used, along with standard polarizers, wave-plates, and optical components. The LOV prism pairs were circular quartz wedges (birefringence of ~0.0091) with a wedge angle of 2° and diameter of 2.54 cm. One wedge had the optical axis aligned with wedge angle while the other wedge had the optical axis aligned 45° to wedge angle. For images shown in FIG. 6 the setup consisted of a laser, a linear polarization filter, a quarter-wave plate, N LOV prism pairs, a quarter-wave plate, a linear polarization filter, and a CMOS camera. For beam phase imaging shown in FIG. 8, a four-mirror interferometer was used because it allowed for compensation of the beam deviation due to the LOV prism pairs. An alternative method would have been to add a non-birefringent prism after each prism of the LOV prism pair in order to compensate for the beam deviation. A linear phase gradient in FIG. 7 was introduced to obtain the fork structure holograms by tilting the mirror of the interferometer path which did not contain the LOV prism pairs. With reference to FIG. 7, the N=2 sets of LOV prism pairs are placed in one path of the interferometer and a linear phase gradient is applied in the other path (Gy~20 rad/mm) by tilting a mirror in order to pronounce the fork structure holograms in the lattice, which indicate the presence of OAM beams.

In a general aspect of what is disclosed, a beam having a periodic structure is generated. The periodic structure includes orbital angular momentum states coupled to states of a two-level quantum subsystem.

Implementations may include one or more of the following features. The beam can be a particle beam (e.g., neutron beam, electron beam) and the states of the two-level quantum subsystem can be spin states. The beam can be an optical beam and the states of the two-level quantum subsystem can be polarization states.

In a first example, a first beam is received. The first beam being is associated with a first orbital angular momentum (OAM) mode and a first polarization (e.g., the first beam can be a plane wave). The first beam is transformed into a second beam, and the second beam is associated with a spatially periodic structure. The periodic structure includes a first portion and a second portion. The first portion has the first OAM mode and the first polarization, and the second portion has a second OAM mode and a second polarization.

Implementations of the first example may include one or more of the following features. The periodic structure includes a two-dimensional lattice of cells. Each cell may include a first portion and a second portion, the first portion having the first OAM mode and the first polarization, and the second portion having the second OAM mode and the second polarization. A first cell in the lattice of cells is offset from a second cell in the lattice cells by a first distance in a first lattice direction. The first cell is offset from a third cell in the lattice of cells by the first distance in a second lattice direction. The first cell is offset from a fourth cell in the lattice of cells by the first distance in a third lattice direction. The first cell is offset from a firth cell in the lattice of cells by the first distance in a fourth lattice direction.

Implementations of the first example may further include one or more of the following features. An electrical signal is received, and in response to receiving the electrical signal, the first distance is changed to a second distance that is different from the first distance. The first polarization is orthogonal to the second polarization. Each cell in the lattice is associated with a mean radial mode, and the mean radial mode is based, at least in part, on a number of prism pairs that the first beam passes through. On one or more non-birefringent prisms compensate for spatial beam displacement caused by the prism pairs. The first OAM mode and second OAM are incremented based on a polarization filter.

In a second example, an optical device includes an inlet to receive a first beam, and one or more prism pairs. The prism pairs include one or more birefringent gradients configured to transform the first beam into a second beam associated with a spatially periodic structure. The periodic structure includes a first portion and a second portion. The first portion is associated with a first orbital angular momentum (OAM) mode and a first polarization, and the second portion is associated with a second OAM mode and a second polarization.

Implementations of the second example may include one or more of the following features. The first prism pair of the one or more prism pairs includes a first optical birefringent prism having first and second exterior surfaces that that form an angle of incline along a first direction, and a second optical birefringent prism having third and fourth exterior surfaces that form the angle of incline along a second direction that is substantially perpendicular to the first direction. The first beam passes through the first, the second, the third, and the fourth exterior surfaces to form the second beam. The first optical birefringent prism has a first optical axis at a first orientation, and the second optical birefringent prism has a second optical axis at a second orientation that is offset from the first orientation by a first angle. The first angle can be 45 degrees, for example.

Implementations of the second example may further include one or more of the following features. The spatially periodic structure includes a two-dimensional lattice of periodically spaced cells separated by a lattice spacing distance. The lattice spacing distance is proportional to a wavelength of the first beam, inversely proportional to a birefringence of the first and the second optical birefringent prisms, and inversely proportional to the tangent of the angle of incline.

Implementations of the second example may further include one or more of the following features. A second prism pair of the one or more prism pairs includes a third optical birefringent prism having fifth and sixth exterior surfaces that that form the angle of incline along the first direction, a fourth optical birefringent prism having seventh and eighth exterior surfaces that form the angle of incline along the second direction. The first beam passes through the fifth, the sixth, the seventh, and the eighth exterior surfaces to form the second beam.

Implementations of the second example may further include one or more of the following features. A mean radial mode of the second beam is based, at least in part, on a number of the one or more prism pairs. The optical device includes one or more optical non-birefringent prisms, each being associated with a respective optical birefringent prism. Each optical non-birefringent prism has exterior surfaces that form the angle of incline, and each optical non-birefringent prism is oriented in a direction opposite to a direction of the respective optical birefringent prism. The optical device further includes electrodes configured to receive an electrical signal that generates an external electric field across at least one of the first and the second optical birefringent prisms.

Implementations of the second example may further include one or more of the following features. The periodic structure includes a two-dimensional lattice of cells, with each cell including a first portion and a second portion, where the first portion is associated with the first OAM mode and the first polarization, and the second portion is associated with the second OAM mode and the second polarization. The optical device may further include a polarization filter that the second beam passes through, and the polarization filter can increment OAM modes of one or more cells in the lattice of cells.

In a third example, a first beam is transformed to a second beam. The first beam is a circularly polarized beam (in some cases, in the zero radial mode and zero orbital angular momentum (OAM) mode) over a transverse range of the first beam. The second beam has, over the transverse range of the second beam, a spatially periodic structure of polarization modes coupled to OAM modes.

Implementations of the third example may include one or more of the following features. The periodic structure defines a two-dimensional lattice of cells spaced apart from each other over the transverse range of the beam by a lattice period, and the method includes controlling the lattice period. Each lattice cell of the second beam has a mean radial mode, and the method includes controlling the mean radial mode of the lattice cells. A spatial beam displacement of the second beam with respect to the first beam is controlled. OAM modes coupled to the polarization modes in each lattice cell are controlled. The periodic structure defines a two-dimensional lattice of cells, where each cell comprises a first OAM mode (e.g., the OAM=0) mode correlated with a first polarization mode, and a second OAM mode (e.g., the OAM=1) mode correlated with a second polarization mode.

In a fourth example, an optical device includes an inlet to receive a beam, and an optical path comprising a plurality of optical birefringent prisms. The optical path is configured to produce a second beam from the first beam. The second beam has, over a transverse range of the beam, a spatially periodic structure of polarization modes coupled to orbital angular momentum (OAM) modes.

Implementations of the fourth example may include one or more of the following features. The plurality of optical birefringent prisms can include a first optical birefringent prism comprising first and second exterior surfaces that define an angle of incline along a first direction; and a second optical birefringent prism comprising third and fourth exterior surfaces that define the angle of incline along a second direction that is perpendicular to the first direction; wherein the optical path traverses the first and second exterior surfaces, and the third and fourth exterior surfaces.

Implementations of the fourth example may include one or more of the following features. The first optical birefringent prism has a first optics axis at a first orientation, and the second optical birefringent prism has a second optics axis at a second orientation that is offset from the first orientation by an offset angle of 45 degrees. The periodic structure defines a two-dimensional lattice of cells spaced apart from each other over the transverse range of the beam by a lattice period (or lattice constant)

$$a = \frac{\lambda}{\Delta n \tan(\theta)},$$

where $\lambda$ represents a wavelength of the beam, $\Delta n$ represents a birefringence of the first and second optical birefringent prisms, and $\theta$ represents the angle of incline.

Implementations of the fourth example may include one or more of the following features. The plurality of optical birefringent prisms includes a series of prism pairs. Each respective prism pair includes a first optical birefringent prism comprising first and second exterior surfaces that define an angle of incline along a first direction; and a second optical birefringent prism comprising third and fourth exterior surfaces that define the angle of incline along a second direction that is perpendicular to the first direction. The optical path comprises the first and second exterior surfaces of each prism pair, and the third and fourth exterior surfaces of each prism pair.

Implementations of the fourth example may include one or more of the following features. The second beam has a mean radial mode that is related to the number of prism pairs in the series of prism pairs. The optical path includes optical non-birefringent prisms associated with the respective optical birefringent prisms, wherein each optical non-birefringent prism comprises exterior surfaces that define an angle of incline in a direction that is opposite a direction of an angle of incline defined by exterior surfaces of the associated optical birefringent prism. The optical device include electrodes that generate an external electric field across at least one the optical birefringent prisms.

Implementations of the fourth example may include one or more of the following features. The periodic structure defines a two-dimensional lattice of cells, where each cell comprises a first OAM mode (e.g., the OAM=0) mode correlated with a first polarization mode, and a second OAM mode (e.g., the OAM=1) mode correlated with the second polarization mode. The optical device can include an optical element comprising a circular birefringence, and the optical element can be configured to modify the second beam such that each cell is centered at the corners of original second beam, and each cell now comprises a third OAM mode (e.g., the OAM=0 mode) correlated with the first polarization mode; and a fourth OAM mode (e.g., the OAM=−1 mode) correlated with the second polarization mode. The optical device includes a polarization filter that interacts with the second beam to increment the OAM modes in each lattice cell.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of embodiments have been described. Nevertheless, it will be understood that various modifications can be made. Accordingly, other embodiments are within the scope of the following claims.

What is claimed is:

1. A method comprising:
    receiving a first beam, the first beam being associated with a first orbital angular momentum (OAM) mode and a first polarization; and
    transforming the first beam into a second beam, the second beam being associated with a lattice of cells, wherein each of the cells comprises a first portion and a second portion, the first portion being associated with the first OAM mode and the first polarization, and the second portion being associated with a second OAM mode and a second polarization, wherein the first beam is transformed to the second beam by a number of birefringent prism pairs, each cell in the lattice is associated with a mean radial mode, and the mean radial mode is based on the number of birefringent prism pairs.

2. The method of claim 1, wherein a first cell in the lattice of cells is offset from a second cell in the lattice of cells by a first distance in a first lattice direction, and the first cell is offset from a third cell in the lattice of cells by the first distance in a second lattice direction, the first cell is offset from a fourth cell in the lattice of cells by the first distance in a third lattice direction, and the first cell is offset from a fifth cell in the lattice of cells by the first distance in a fourth lattice direction.

3. The method of claim 2, further comprising:
    receiving an electrical signal; and
    in response to receiving the electrical signal, changing the first distance to a second distance different from the first distance.

4. The method of claim 1, wherein the first polarization is orthogonal to the second polarization.

5. The method of claim 1, wherein one or more non-birefringent prisms compensate for deviation caused by the birefringent prism pairs.

6. The method of claim 1, comprising incrementing the first OAM mode and second OAM mode by a polarization filter.

7. The method of claim 1, wherein each cell comprises:
    the OAM=0 mode correlated with a first polarization mode; and
    the OAM=1 or the OAM=−1 mode correlated with a second polarization mode.

8. An optical device comprising:
    an inlet to receive a first beam; and
    one or more prism pairs comprising one or more birefringent gradients configured to transform the first beam into a second beam, the second beam being associated with a spatially periodic structure, wherein the periodic structure comprises first portions and second portions, the first portions each being associated with a first orbital angular momentum (OAM) mode and a first polarization, and the second portions each being associated with a second OAM mode and a second polarization.

9. The optical device of claim 8, wherein a first prism pair of the one or more prism pairs comprises:
    a first optical birefringent prism comprising a first and a second exterior surfaces that form an angle of incline along a first direction;
    a second optical birefringent prism comprising a third and a fourth exterior surfaces that form the angle of incline along a second direction that is substantially perpendicular to the first direction; and
    wherein the first beam passes through the first, the second, the third, and the fourth exterior surfaces.

10. The optical device of claim 9, further comprising optical non-birefringent prisms associated with the respective optical birefringent prisms, wherein each optical non-birefringent prism comprises exterior surfaces that form the angle of incline and wherein each optical non-birefringent prism is oriented in a direction opposite to a direction of the associated optical birefringent prism.

11. The optical device of claim 9, wherein the first optical birefringent prism comprises a first optical axis at a first orientation, and the second optical birefringent prism comprises a second optical axis at a second orientation that is offset from the first orientation by a first angle.

12. The optical device of claim 11, wherein the first angle is substantially 45 degrees.

13. The optical device of claim 9, wherein the spatially periodic structure comprises a two-dimensional lattice of periodically spaced cells separated by a lattice period, the lattice period being proportional to a wave length of the first beam, inversely proportional to a birefringence of the first and the second optical birefringent prisms, and inversely proportional to the tangent of the angle of incline.

14. The optical device of claim 9, wherein a second prism pair of the one or more prism pairs comprises:
a third optical birefringent prism comprising a fifth and a sixth exterior surfaces that that form the angle of incline along the first direction;
a fourth optical birefringent prism comprising a seventh and an eighth exterior surfaces that form the angle of incline along the second direction; and
wherein the first beam passes through the fifth, the sixth, the seventh, and the eighth exterior surfaces.

15. The optical device of claim 14, wherein a mean radial mode of the second beam is, at least in part, based on a number of the one or more prism pairs.

16. The optical device of claim 9, further comprising:
electrodes configured to receive an electrical signal that generates an external electric field across at least one of the first and the second optical birefringent prisms.

17. The optical device of claim 8, wherein the periodic structure comprises a two-dimensional lattice of cells, each cell comprising a first portion and a second portion, the first portion being associated with the first OAM mode and the first polarization, and the second portion being associated with the second OAM mode and the second polarization.

18. The optical device of claim 17, further comprising a polarization filter that the second beam passes through, wherein the polarization filter increments OAM modes of one or more cells in the lattice of cells.

19. A method comprising:
receiving a first beam that is circularly polarized, in the zero radial mode and in the zero orbital angular momentum (OAM) mode over a transverse range of the first beam; and
transforming the first beam to a second beam, the second beam comprising, over a transverse range of the second beam, a spatially periodic structure of polarization modes coupled to OAM modes.

20. The method of claim 19, wherein the spatially periodic structure defines a two-dimensional lattice of cells spaced apart from each other over the transverse range of the second beam by a lattice period, and the method comprises controlling the lattice period.

21. The method of claim 19, wherein the spatially periodic structure defines a two-dimensional lattice of cells, and the method comprises controlling the mean radial mode of the lattice cells.

22. The method of claim 19, comprising controlling a spatial beam displacement of the second beam with respect to the first beam.

23. The method of claim 19, comprising controlling OAM modes coupled to the polarization modes in each lattice cell.

24. The method of claim 19, wherein the spatially periodic structure defines a two-dimensional lattice of cells, and each cell comprises:
the OAM=0 mode correlated with a first polarization mode; and
the OAM=1 or the OAM=−1 mode correlated with a second polarization mode.

* * * * *

UNITED STATES PATENT AND TRADEMARK OFFICE
CERTIFICATE OF CORRECTION

PATENT NO. : 10,782,464 B1
APPLICATION NO. : 15/824560
DATED : September 22, 2020
INVENTOR(S) : Sarenac et al.

Page 1 of 1

It is certified that error appears in the above-identified patent and that said Letters Patent is hereby corrected as shown below:

On the Title Page

Page 2, item (56) 2nd column, Line 25, delete "Intererence," and insert -- Interference, -- therefor.

In the Specification

Column 2, Line 58, delete "Δ" and insert -- $\lambda$ -- therefor.

Column 4, Line 3, delete "45'." and insert -- 45°. -- therefor.

Column 4, Line 58, delete "that that" and insert -- that -- therefor.

Column 6, Line 59, delete "decreased." and insert -- decreased). -- therefor.

Column 11, Line 10, delete "lh." and insert -- $\ell\hbar$. -- therefor.

Column 15, Line 20, delete "that that" and insert -- that -- therefor.

Column 15, Line 45, delete "that that" and insert -- that -- therefor.

In the Claims

Column 19, Line 11, Claim 14, delete "that that" and insert -- that -- therefor.

Signed and Sealed this
Third Day of November, 2020

Andrei Iancu
*Director of the United States Patent and Trademark Office*